(12) United States Patent
Witt et al.

(10) Patent No.: US 9,421,934 B1
(45) Date of Patent: Aug. 23, 2016

(54) VEHICLE EJECTION MITIGATION DEVICES

(71) Applicant: AUTOLIV ASP, INC., Ogden, UT (US)

(72) Inventors: John Witt, Clinton Township, MI (US);
Dino Forton, Chesterfield Township, MI (US); Richard Petrusev, Oxford, MI (US); Vince Pizzo, Shelby Township, MI (US); Bill Sobkowicz, Macomb, MI (US); Brian Keith Czach, Shelby Township, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/620,068

(22) Filed: Feb. 11, 2015

(51) Int. Cl.
*B60R 21/06* (2006.01)
*B60R 21/11* (2006.01)
*B60R 21/02* (2006.01)

(52) U.S. Cl.
CPC .............. *B60R 21/06* (2013.01); *B60R 21/11* (2013.01); *B60R 2021/028* (2013.01); *B60R 2021/0253* (2013.01)

(58) Field of Classification Search
CPC   B60R 13/02; B60R 13/0206; B60R 13/0212; B60R 21/02; B60R 21/04; B60R 21/06; B60R 21/11; B60R 21/214; B62D 25/06
USPC .................. 296/187.05, 187.13, 214; 280/749
See application file for complete search history.

(56) References Cited

U.S. PATENT DOCUMENTS

| 5,460,409 | A | * | 10/1995 | Conner | ................... B60R 21/06 160/327 |
| 5,775,726 | A | | 7/1998 | Timothy et al. | |
| 6,460,919 | B2 | * | 10/2002 | Bienert | ................... B60J 7/003 296/214 |

* cited by examiner

*Primary Examiner* — Jason S Daniels
(74) *Attorney, Agent, or Firm* — Stoel Rives LLP

(57) ABSTRACT

Ejection mitigation devices are disclosed that limit, prevent, or otherwise mitigate vehicle occupant ejection through the roof of a vehicle in events involving roof failure. The ejection mitigation devices are to be installed at the roof of the passenger compartment of the vehicle. The devices include a canopy having sufficient strength to restrain movement of a vehicle occupant through the canopy. The canopy is configured to be attached to one or more roof rails of the passenger compartment at a position interior to the outer roof skin.

21 Claims, 7 Drawing Sheets

VEHICLE EJECTION MITIGATION DEVICES

BACKGROUND

Occupant restraint devices and systems are used in vehicles for restraining or securing a seated occupant during a collision or other vehicle impact event or accident event.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

As will be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive).

Occupant restraint devices and systems are used in vehicles for restraining or securing a seated occupant during a collision or other vehicle impact. Examples of such devices and systems include seat belts and inflatable airbag systems. These are widely used to reduce or minimize occupant injury during a collision or other accident event.

Some vehicles, during rollover incidents, suffer from roof failure. Moreover, the materials and construction of vehicle bodies are evolving, and the evolution may lead to increased possibility of roof failure during rollover accidents. Ejection of an occupant through the roof is undesirable, and a vehicle that presents such possibility of occupant ejection may fail to pass industry standards. Existing occupant restraint devices and systems may have shortcomings in regard to limiting occupant ejection in the event of roof failure. For example, curtain airbags may deploy to limit occupant ejection through side windows of a vehicle cabin, but may not limit occupant ejection in an event of roof failure. Seatbelts are designed to restrain an occupant during a frontal collision but may, in a rollover incident, fail to secure movement of an occupant toward the roof and thus may not limit occupant ejection through the roof. The present inventors have recognized that these and other shortcomings of existing restraint systems and devices may be addressed.

Figure 1:
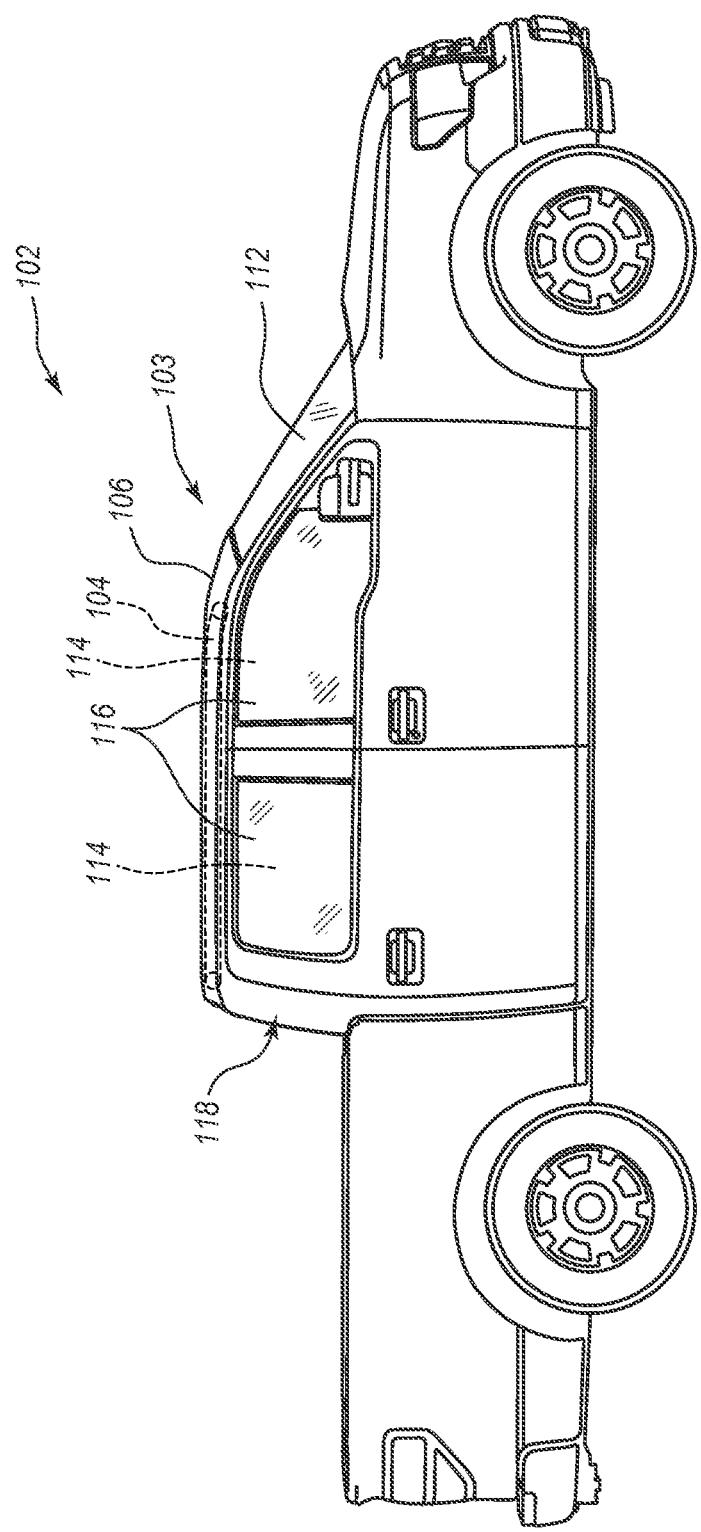
FIG. 1 is a side view of a vehicle including a vehicle ejection mitigation device, according to one embodiment.

FIG. 1 is a side view of a vehicle 102 including a vehicle ejection mitigation device 104, according to one embodiment. The vehicle ejection mitigation device 104 may attempt to address the shortcomings of existing occupant restraint devices and systems as referenced above. As shown, the vehicle ejection mitigation device 104 may be installed in a roof 106 of a passenger compartment 103 of the vehicle 102. For example, the vehicle ejection mitigation device 104 may be placed between an interior roof trim and the outer roof skin. The vehicle ejection mitigation device 104 functions to restrain a vehicle occupant from ejecting through the roof 106 during an accident event, such as a collision or other vehicle impact event.

Particularly during rollover accidents, some vehicles demonstrate roof failures, such as a complete or partial separation of the roof 106 from the passenger compartment 103 or a puncture of the roof 106. More specifically, the outer roof skin (e.g. metal or carbon-fiber roof panel forming a top of the passenger compartment) of the roof 106 may partially or completely separate from other structural elements of the passenger compartment 103. A failure of the roof 106 can allow the vehicle occupant(s) to be ejected (or partially ejected) as the vehicle 102 rolls. Other occupant restraint systems, such as frontal airbags and curtain airbags, may restrain a vehicle occupant from ejection through a windshield 112, driver side windows 114, passenger side windows 116, and/or rear windows 118. However, these occupant restraint systems are ineffective in restraining an occupant travelling in an upward direction relative to the vehicle (e.g., a direction through the roof 106 of the vehicle 102), such as the direction 150 indicated in FIG. 1 by an arrow. Presently available occupant restraint systems are ineffective in preventing occupant ejection in the direction 150 through the roof 106 when the roof 106 of the vehicle 102 fails. The vehicle ejection mitigation device 104 can prevent ejection of a vehicle occupant through the roof 106 in situations where the roof 106 fails.

The vehicle 102 of FIG. 1 is an extended cab pick-up truck. As can be appreciated, the disclosed embodiments are not limited to use in extended cab pick-up trucks, but may be used in any passenger vehicle, including but not limited to standard cab pick-up trucks, sedans, vans, sport utility vehicles ("SUVs"), and the like.

Figure 2:
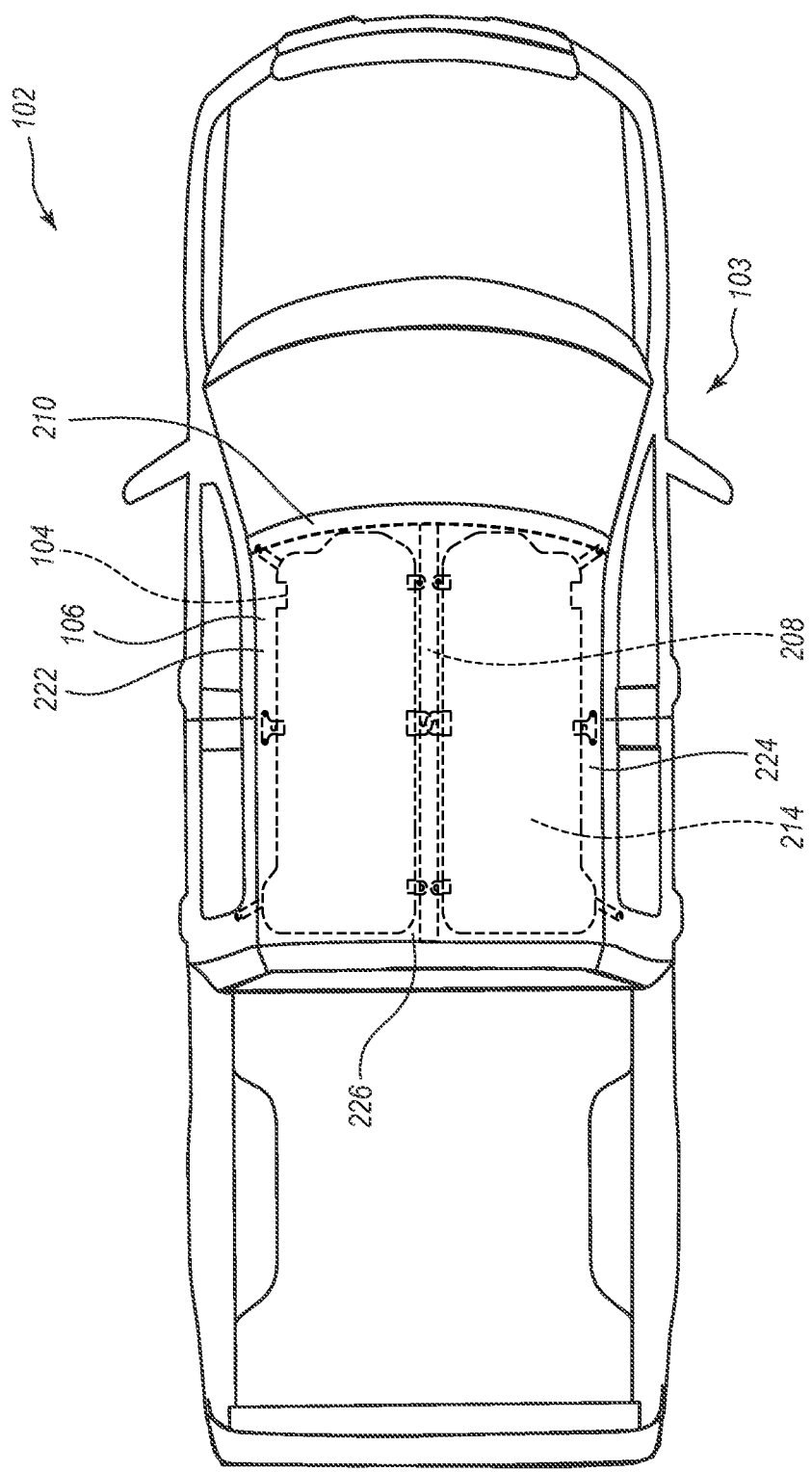
FIG. 2 is a top view of a vehicle including a vehicle ejection mitigation device, according to one embodiment.

FIG. 2 is a top view of the vehicle 102 of FIG. 1, illustrating the vehicle ejection mitigation device 104, according to one embodiment. As shown, the vehicle ejection mitigation device 104 may include one or more canopies 212, 214. The illustrated embodiment of FIG. 2 includes a driver side canopy 212 and a passenger side canopy 214. The one or more canopies 212, 214 may be shaped to correspond to a shape of the roof 106 of the passenger compartment 103 of the vehicle 102. The one or more canopies 212, 214 are secured to the vehicle 102, and specifically to structural elements of the passenger compartment 103, at various mounting points. For example, as illustrated, the vehicle ejection mitigation device 104 may be mounted to a center beam 208 of the roof, a header 210 of the roof 106, a driver side roof rail 222, a passenger side roof rail 224, and/or other elements of the passenger compartment 103.

The driver side canopy 212 is positioned over a driver occupant position of the passenger compartment 103. The driver side canopy 212 is secured to the header 210 of passenger compartment 103 in front, to the center beam 208 on an inboard side, and to the driver side roof rail 222 on the outboard side. The driver side canopy 212 may also be secured to a rear roof rail 226 at the rear. The driver side canopy 212 may also be secured to one or more pillars (e.g., A pillar, B pillar, C pillar, etc.) of the passenger compartment 103 of the vehicle 102, for example by a mounting point or a tether. The driver side canopy 212 is shaped to correspond to a shape of a driver side of the roof 106.

The passenger side canopy 214 is positioned over a passenger occupant position of the passenger compartment 103. The passenger side canopy 214 is secured to the header 210 of passenger compartment 103 in front, to the center beam 208 on an inboard side, and to the passenger side roof rail 224 on the outboard side. The passenger side canopy 214 may also be secured to a rear roof rail 226 at the rear. The passenger side canopy 214 may also be secured to one or more pillars (e.g., A pillar, B pillar, C pillar, etc.) of the passenger compartment 103 of the vehicle 102, for example by a mounting point or a tether. The passenger side canopy 214 is shaped to correspond to a shape of a passenger side of the roof 106.

In other embodiments a single canopy may be positioned to extend over driver occupant position and the passenger occupant position, such as over a front seat of a passenger compartment. A second single canopy may be positioned to extend over a second seat (or back seat) of passenger compartment, from the driver side to the passenger side. In still other embodiments, the vehicle ejection mitigation device 300 may include a single canopy that may extend across the entire roof of the passenger compartment 103, over both a driver side and a passenger side and both a front seat and a back seat. In still other embodiments, the vehicle ejection mitigation device 300 may include a single canopy over a single passenger compartment position, such as over a driver seat.

The vehicle 102 of FIG. 2 is an extended cab pick-up truck. As noted above with reference to FIG. 1, the disclosed embodiments are not limited to use in extended cab pick-up trucks, but may be used in any passenger vehicle, including but not limited to standard cab pick-up trucks, sedans, vans, sport utility vehicles ("SUVs"), and the like.

Figure 3:
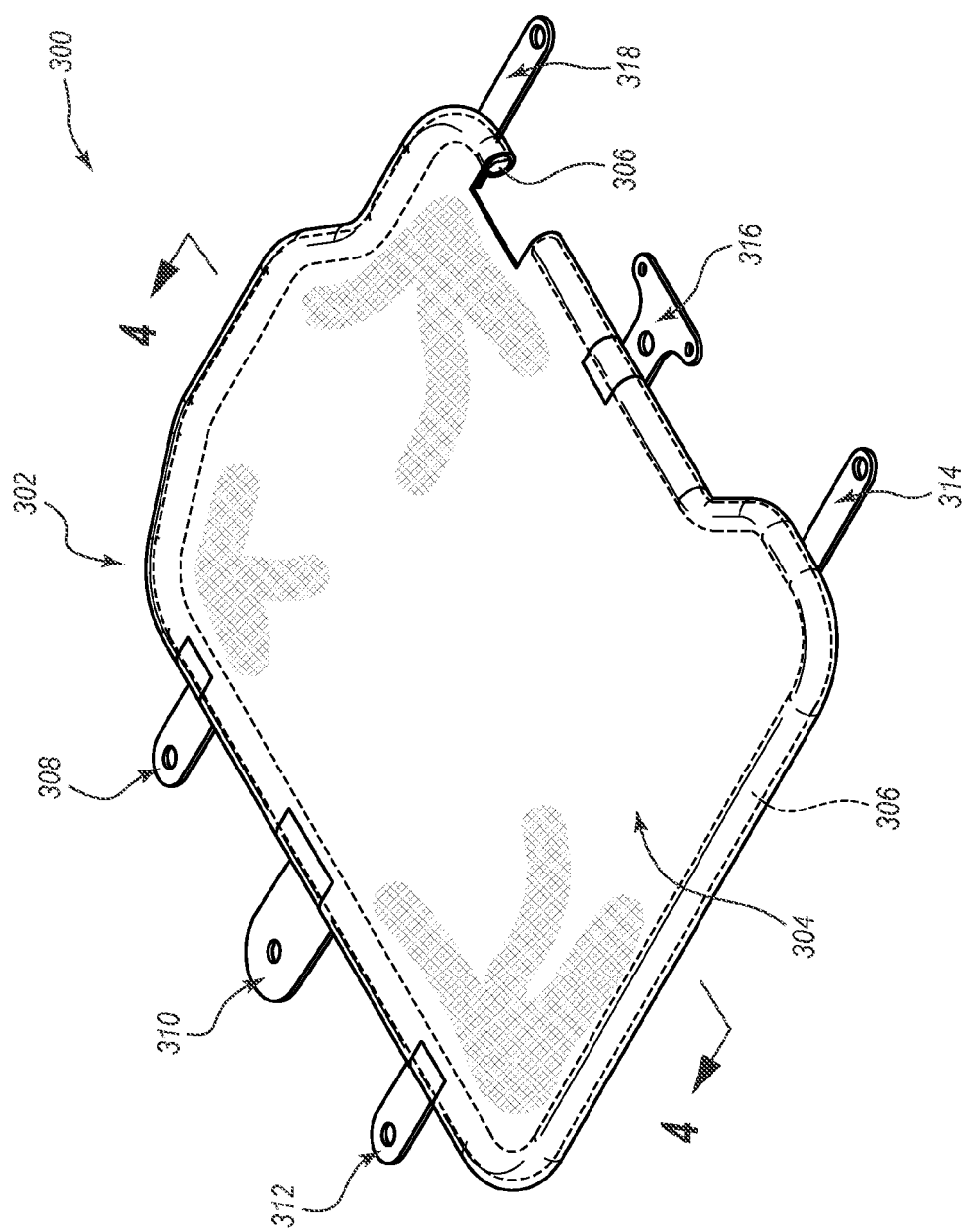
FIG. 3 is a perspective view of a vehicle ejection mitigation device, according to one embodiment.

FIG. 3 is a perspective view of a vehicle ejection mitigation device 300, according to one embodiment. The vehicle ejection mitigation device 300 is a canopy 302 with a plurality of mounting tabs 308-318. The canopy 302 includes a fabric panel 304 and a frame 306. The canopy 302 may be one of the canopies 212, 214 of the vehicle ejection mitigation device 104 shown in FIGS. 1 and 2. The canopy 302 functions to mitigate ejection of the occupant(s) of a vehicle through a roof of the vehicle, as described above.

The fabric panel 304 may be made from woven nylon fabric that is sufficiently strong to retain the occupant(s) of a vehicle during an accident event (e.g., collision, roll-over, other vehicle impact event). Other fabrics may be acceptable, such as polyester fabric or any thin material—woven or otherwise formed—which has sufficient strength to be used for the fabric panel 304. More specifically, the fabric panel 304 is formed of a material with sufficient strength to restrain movement of a vehicle occupant through the canopy 302. This may prevent ejection of the vehicle occupant out of the top of the passenger compartment during an accident event resulting in failure of an outer roof skin of the roof. To that end, panel 304 may be comprised of any fabric strong enough to prevent ejection. The fabric panel 304 may also serve as a noise/sound dampener.

The panel 304 may be sandwiched between a headliner (e.g., roof trim within the passenger compartment) and the outer roof skin (e.g., metal or carbon-fiber roof panel) of the roof of the passenger compartment. The panel 304 may form to and/or around anti-rattle or sound deadening materials as well as other head injury criteria (HIC) counter measures installed at the roof of the passenger compartment. The panel 304 may be formed or otherwise function as an anti-rattle or sound deadening material.

Figure 6:
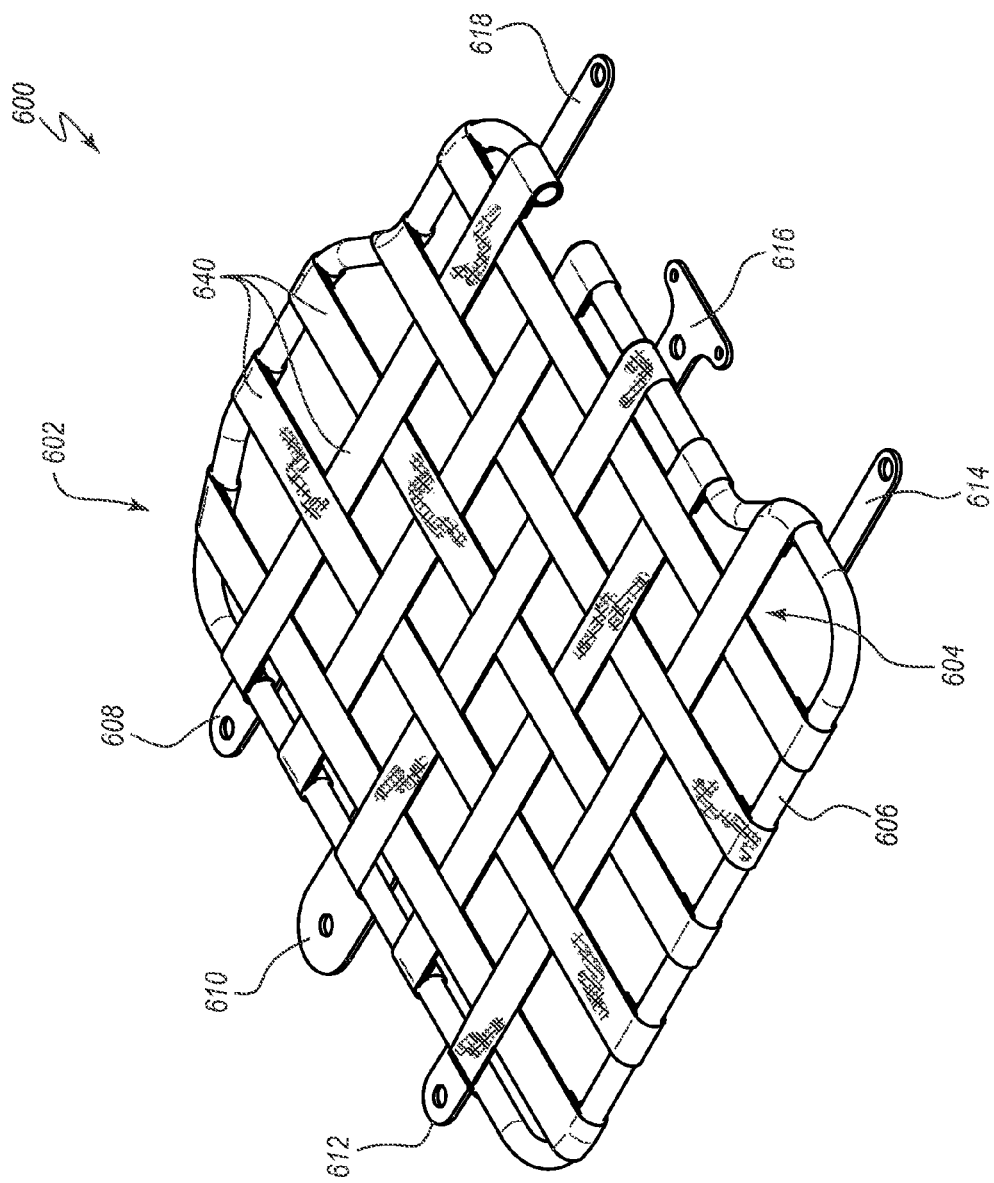
FIG. 6 is a perspective view of a vehicle ejection mitigation device, according to another embodiment.

The fabric panel may be one piece or may be several straps woven together to form a net or web which may provide additional strength. An example of a fabric net is shown in FIG. 6, and described below with reference to the same.

In other embodiments, the panel 304 may be formed of a sheet of plastic, metal, or any other material having sufficient strength to retain the occupant(s) of a vehicle against ejection through the top of the passenger compartment during an accident event.

The frame 306 may form a perimeter of the canopy 302 and otherwise define a shape of the canopy 302. The fabric panel 304 may be sewn to the frame 306, sewn to itself around the frame 306, or otherwise mounted to the frame 306. The frame 306 is formed of a material that is sufficiently rigid to hold the fabric panel 304 in shape. For example, frame 306 may be made of a steel tube. The frame 306 may also be configured to deform or collapse and/or absorb energy in the event of occupant impact, such as a head strike, to decrease likelihood of injury due to an occupant striking the frame 306. In the illustrated embodiment of FIG. 3, the panel 304 wraps around the frame 306 and is sewn to itself to secure the panel 304 to the frame 306. In other embodiments, the panel 304 may be secured to the frame 306 with threaded fasteners, rivets, welding, fabric straps, or other attachment methods.

In other embodiments, the frame 306 may be disposed along two opposing sides of the panel 304, and may not be disposed along two opposing ends of the panel 304. In another embodiment, the frame 306 may be disposed along the two opposing ends of the panel 304, and may not be disposed along the two opposing sides of the panel 304. In other embodiments, the frame 306 may be solid, rather than a hollow tube. The frame 306 may be formed of one or more flat or rounded bars.

The plurality of mounting tabs 308-318 enable securement of the canopy 302 to a vehicle, and specifically at a roof of a passenger compartment of a vehicle. The plurality of mounting tabs 308-318 enable the vehicle ejection mitigation device 300 to be mounted or otherwise secured to structural elements of a passenger compartment of a vehicle at various points. The mounting tabs 308-318 may be secured to frame 306 at points where it is desirable to attach the vehicle ejection mitigation device 300 to the vehicle. For example, the mounting tabs 308-318 may be positioned to attach to one or more of the header of the roof, the side roof rails, the rear roof rail, and the center beam of the roof.

In the illustrated embodiment of FIG. 3, a first set of the mounting tabs 308, 310, 312 is disposed along an inboard side of the canopy 302 and may be configured to secure the inboard side to the center beam 208 (see FIG. 2). The first set of the mounting tabs 308, 310, 312 may be rigid to fixedly couple the canopy 302 at a top of a passenger compartment of a vehicle, at or near a roof of the vehicle.

A second set of the mounting tabs 314, 316, 318 is disposed along an outboard side of the canopy 302 and may be configured to secure the outboard side to a side roof rail, such as a driver side roof rail 222 or a passenger side roof rail 224 (see FIG. 2). The second set of mounting tabs 314, 316, 318 includes a rigid side rail mounting tab 316 that may be rigid to fixedly couple the canopy 302 at a top of a passenger compartment of a vehicle, at or near a roof of the vehicle. The second set of mounting tabs 314, 316, 318 also includes flexible mounting tabs 314, 318, which may include a tether and provide sufficient flexibility to allow mounting to one or more of the pillars (e.g., the A pillar and the C pillar). The second set of mounting tabs 314, 316, 318 may be configured to fold and collapse during a crash event to absorb energy in compression and for tensile loading.

In other embodiments, the canopy 302 and/or the frame 306 may be secured directly to the header of the roof, the roof rails, or the center beam of the roof. Securement of the canopy 302 and/or the frame 306 directly to the structural elements of the passenger compartment may be accomplished with threaded fasteners, rivets, welding, or other attachment methods.

Figure 4:
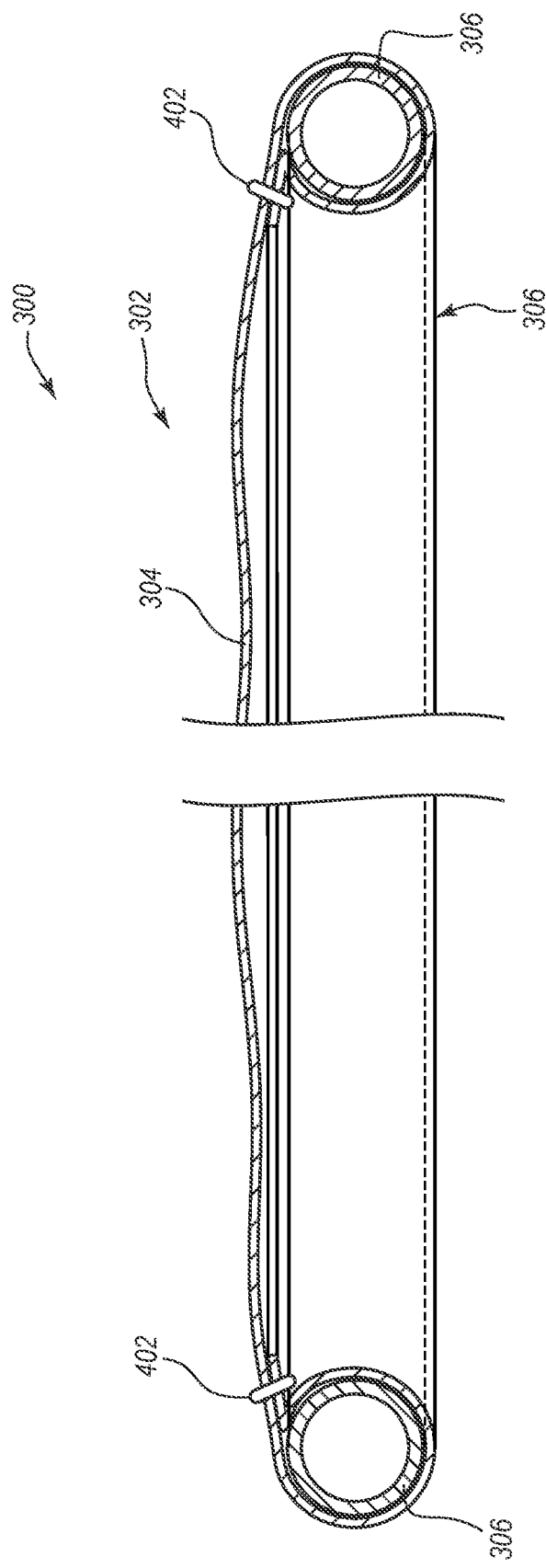
FIG. 4 is a cross sectional view of the vehicle ejection mitigation device shown in FIG. 3.

FIG. 4 is a cross sectional view of the canopy 302 of the vehicle ejection mitigation device 300 taken along line 4-4 of FIG. 3. The panel 304 may wrap around the frame 306 to secure canopy 302 to the frame 306. The panel 304 may be secured in place to or around the frame 306 by a fastener 402 that couples a portion of panel 304 (e.g., a portion wrapped around frame 306) to another portion of the panel 304 (e.g., a main portion of the panel 304 extending within a perimeter defined by the frame 306). The panel 304 may alternatively be coupled directly to the frame 306 by a fastener. The fastener 402 may be a threaded fastener (e.g., screw), a rivet, one or more fabric straps, stitching, a tack, a staple, etc.

The frame 306 may be formed by rigid tubing. For example, as shown, frame 306 may be a hollow tube. Alternatively, the frame 306 may be solid, which may increase the strength of the vehicle ejection mitigation device 300. Frame 306 may be comprised of metal such as steel, aluminum, iron, etc. In yet another embodiment, frame 306 may be comprised of plastic.

Figure 5:
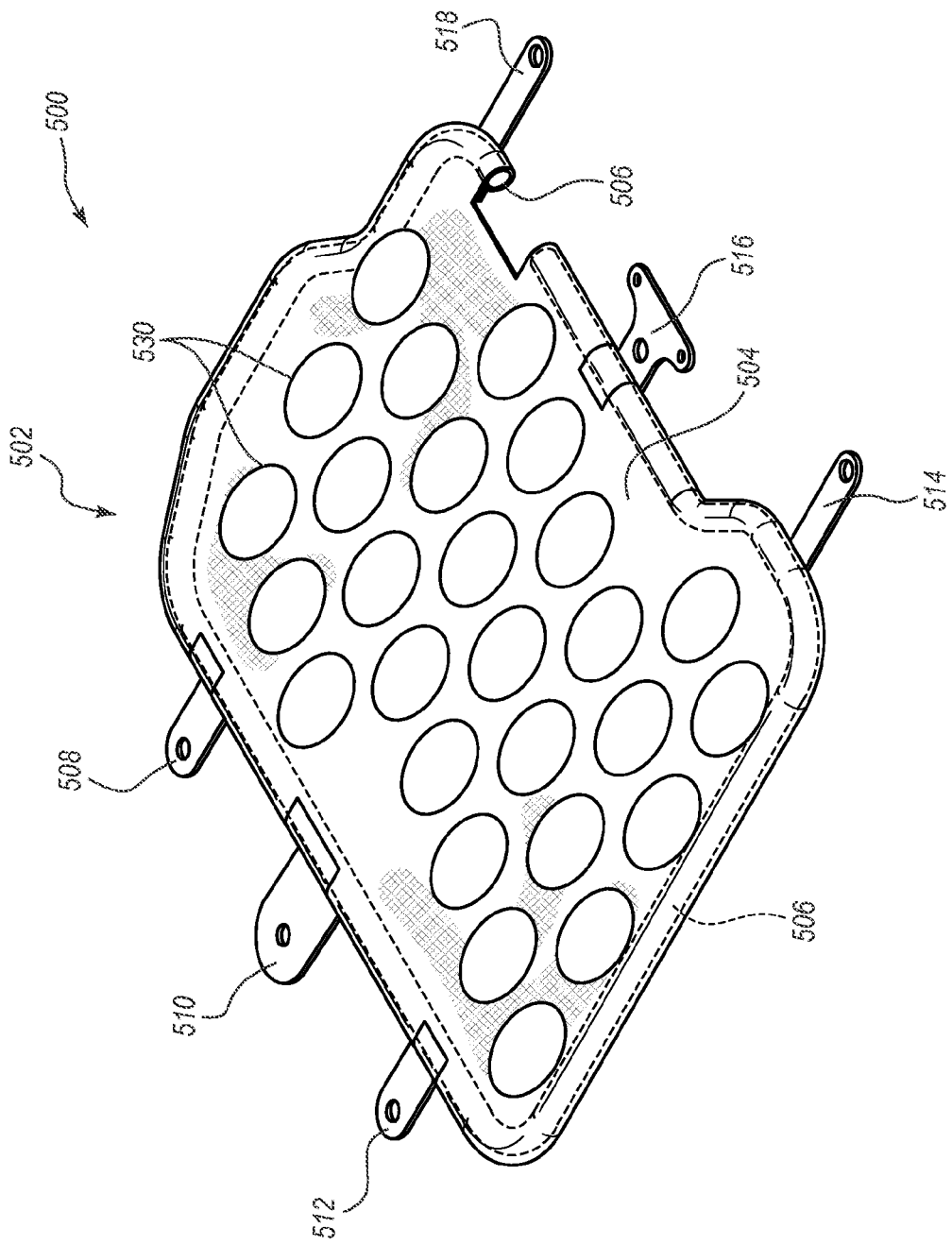
FIG. 5 is a perspective view of a perforated vehicle ejection mitigation device made of metal, according to one embodiment.

FIG. 5 is a perspective view of a vehicle ejection mitigation device 500, according to another embodiment. Like features are designated with like reference numerals, with the leading digits incremented to "5." For example, the embodiment depicted in FIG. 5 includes a canopy 502 that may, in some respects, resemble a canopy 302 of the airbag assembly 300 depicted in FIGS. 3 and 4. Relevant disclosure set forth above regarding similarly identified features thus may not be repeated hereafter. Moreover, specific features of vehicle ejection mitigation device and related components shown in FIGS. 3-4 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the vehicle ejection mitigation device 500 and related components depicted in FIG. 5. Any suitable combination of the features, and variations of the same, described with respect to the vehicle ejection mitigation device 300 and related components illustrated in FIGS. 3 and 4 can be employed with the vehicle ejection mitigation device 500 and related components of FIG. 5, and vice versa. This pattern of disclosure applies equally to further embodiments depicted in subsequent figures and described hereafter, wherein the leading digits may be further incremented.

The vehicle ejection mitigation device 500 is a perforated metal canopy 502 with a plurality of mounting tabs 508-518. The canopy 502 includes a metal panel 504 and a frame 506. The canopy 502 may be one of the canopies 212, 214 of the vehicle ejection mitigation device 104 shown in FIGS. 1 and 2, which function to mitigate ejection of the occupant(s) of a vehicle through a roof of the vehicle, as described above.

The canopy 502 includes a sheet metal panel 504 having sufficient strength to restrain vehicle occupant movement through the panel 504 to prevent ejection of the vehicle occupant in a direction through a top of the passenger compartment. For example, the panel 504 may be formed of steel (e.g., boron steel, Dual Phase 1000), stainless steel, titanium, or the like. The metal panel 504 may be heat-stamped to a sheet of metal. The panel 504 includes a plurality of perforations 530 to reduce a weight of the panel 504. In other embodiments, the metal panel 504 may be one solid piece.

The frame 506 may form a perimeter of the canopy 502 and otherwise define a shape of the canopy 502. The panel 504 is secured to or otherwise mounted to the frame 506. The frame 506 may provide additional structural strength to the canopy 502 and/or the panel 504. For example, frame 506 may be formed of a steel tube. The panel 504 may be secured to the frame 506 with threaded fasteners, rivets, welding, or other attachment or fastening methods and devices.

The plurality of mounting tabs 508-518 enable securement of the canopy 502 to a vehicle, and specifically at a roof of a passenger compartment of a vehicle. The plurality of mounting tabs 508-518 enable the vehicle ejection mitigation device 500 to be secured to structural elements of a passenger compartment of a vehicle at various points. The mounting tabs 508-518 may be secured to the panel 504 and/or the frame 506 at points where it is desirable to attach the vehicle ejection mitigation device 500 to the vehicle. For example, the mounting tabs 508-518 may be positioned to attach to one or more of the header of the roof, the side roof rails, the rear roof rail, and the center beam of the roof, similar to the mounting tabs 308-318 described above with reference to FIG. 3.

In other embodiments, the panel 504, the frame 506, and/or the canopy 502 may be attached directly to the header of the roof, the roof rails, or the center beam of the roof along a perimeter of the sheet metal panel 504. The direct attachment to the structural elements of the passenger compartment may be accomplished with threaded fasteners, rivets, welding, or other attachment methods.

Figure 7:
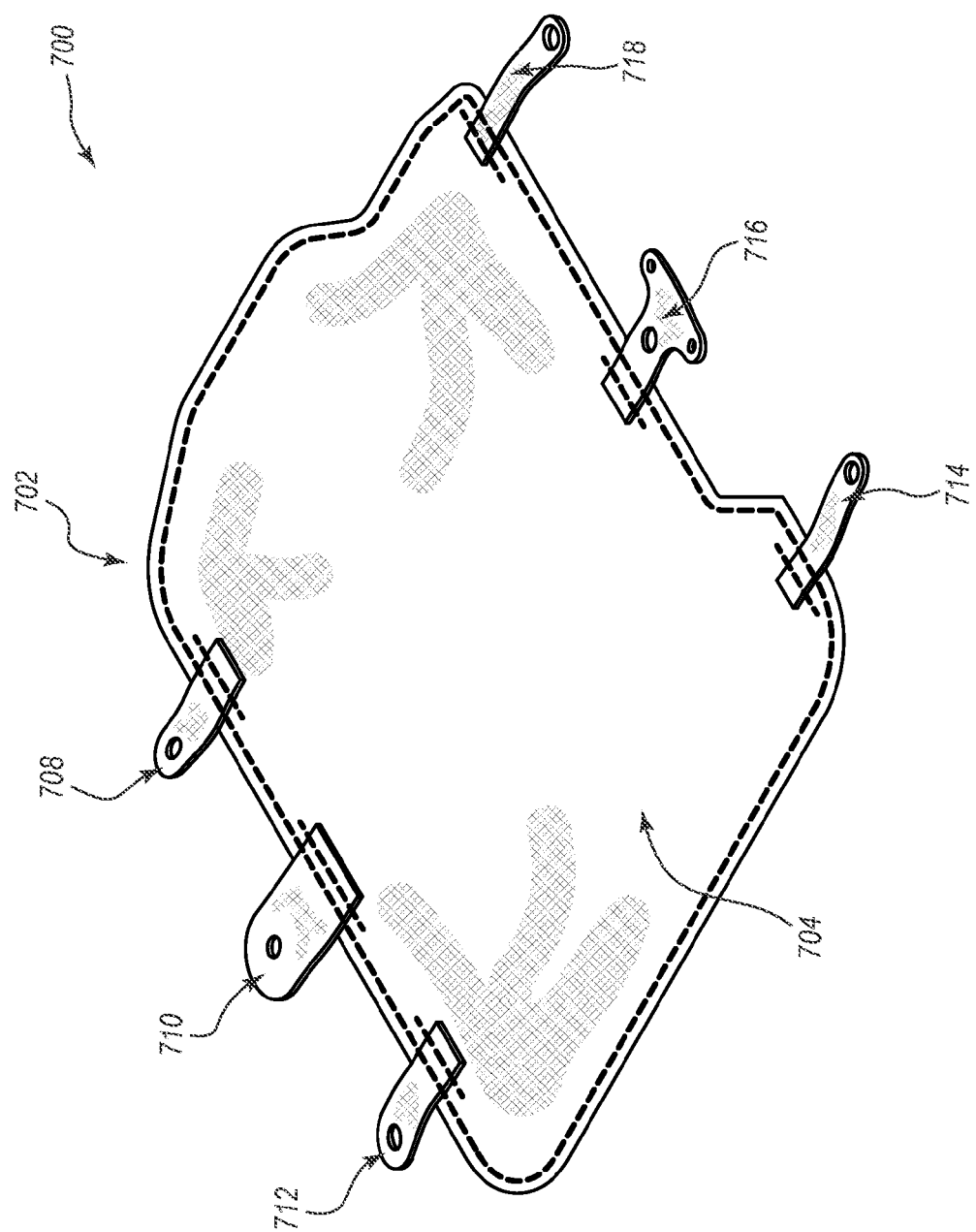
FIG. 7 is a perspective view of a vehicle ejection mitigation device, according to another embodiment.

Although the canopy 502 of the illustrated embodiment of FIG. 5 includes a frame 506, other embodiments may not include the frame 506. The canopy 502 may simply comprise the metal panel 504. The mounting tabs 508-518 may couple the panel 504, by itself, to structural elements at a roof of the passenger compartment of the vehicle. In still other embodiments, the panel 504 alone may be directly secured to structural elements at a roof of the passenger compartment of the vehicle. Described differently, a metal panel 504 alone, secured at a roof of a passenger compartment of a vehicle, interior to an outer roof skin, may function as a vehicle ejection mitigation device according to the present disclosure. The metal panel 504 may be disposed interior to an outer roof skin that may be formed of a material that is vulnerable to failure. The metal panel 504 may be positioned exterior to an interior roof trim of the passenger compartment. FIG. 7 provides an example of a canopy without a frame.

FIG. 6 is a perspective view of a vehicle ejection mitigation device 600, according to still another embodiment. The vehicle ejection mitigation device 600 is a woven canopy 602 with a plurality of mounting tabs 608-618. The canopy 602 includes a woven panel 604 and a frame 606. The canopy 602 may be one of the canopies 212, 214 of the vehicle ejection mitigation device 104 shown in FIGS. 1 and 2, which function to mitigate ejection of the occupant(s) of a vehicle through a roof of the vehicle, as described above.

The canopy 602 includes a woven panel 604 having sufficient strength to restrain vehicle occupant movement through the panel 604 to prevent ejection of the vehicle occupant in a direction through a top of the passenger compartment. The illustrated panel 604 is formed of a plurality of woven straps 640 or similar strips or strands of material woven together. The weave pattern of the straps 640 may form a tightly woven panel or a more loosely woven netting, such as shown.

The straps 640 may be mounted, fastened, or otherwise attached to the frame 606, which may form a perimeter of the canopy 602 and otherwise define a shape of the canopy 602. The frame 606 may be formed of a steel tube. The straps 640 and/or the panel 604 may be secured to the frame 606 with stitching, threaded fasteners, rivets, welding, or other attachment or fastening methods and devices.

The plurality of mounting tabs 608-618 enable securement of the canopy 602 to a vehicle, and specifically at a roof of a passenger compartment of a vehicle. The plurality of mounting tabs 608-618 enable the vehicle ejection mitigation device 600 to be secured to structural elements of a passenger compartment of a vehicle at various points, such as to one or more of the header of the roof, the side roof rails, the rear roof rail, and the center beam of the roof, similar to the mounting tabs 308-318 described above with reference to FIG. 3.

FIG. 7 is a perspective view of a vehicle ejection mitigation device 700, according to still another embodiment. The vehicle ejection mitigation device 700 is a canopy 702 with a plurality of mounting tabs 708-718. The canopy 702 is a panel 704 or sheet of material. Different from the canopy 302 of FIG. 3, the canopy 702 is without a distinct frame or rigid support structure (such as frame 306). The canopy 702 may be one of the canopies 212, 214 of the vehicle ejection mitigation device 104 shown in FIGS. 1 and 2, which function to mitigate ejection of the occupant(s) of a vehicle through a roof of the vehicle, as described above.

The panel 704 is formed of a sheet of material, such as fabric, plastic, metal, or any other material having sufficient strength to restrain vehicle occupant movement through the panel 704 to thereby prevent ejection of the vehicle occupant in a direction through a top of the passenger compartment. Rather than being secured to a frame or other rigid support structure, the panel 704 may include a reinforced edge, such as stitching or a seam around the perimeter of the panel 704, or other similar reinforcement, for example, to limit fraying of the material of the panel 704 or otherwise enhance structural durability of the panel 704.

The plurality of mounting tabs 708-718 enable securement of the canopy 702 to a vehicle, and specifically at a roof of a passenger compartment of a vehicle. The plurality of mounting tabs 708-718 in FIG. 7 may be formed of the same material as the panel 704 and may be stitched or otherwise secured to the panel 704 to enable the vehicle ejection mitigation device 700 to be secured to structural elements of a passenger compartment of a vehicle at various points, such as to one or more of the header of the roof, the side roof rails, the rear roof rail, and the center beam of the roof, similar to the mounting tabs 308-318 described above with reference to FIG. 3. As such, the mounting tabs 708-718 may be flexible, yet of sufficient strength to secure the canopy 702 at the roof of a passenger compartment of a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be obvious to those having skill in the art that many changes may be made to the details of the above-described embodiments without departing from the underlying principles of the invention. The scope of the present invention should, therefore, be determined only by the following claims.

We claim:

1. An ejection mitigation device to be installed in a roof of a passenger compartment of a vehicle, comprising:
a canopy having sufficient strength to restrain movement of a vehicle occupant through the canopy to prevent ejection of the vehicle occupant out a top of the passenger compartment during an accident event resulting in failure of an outer roof skin of the roof,
wherein the canopy is configured to mount to one or more roof rails of the passenger compartment of the vehicle at a position interior to the outer roof skin, and the canopy comprises:
a fabric net woven of straps of fabric material having sufficient strength to restrain vehicle occupant movement through the fabric net to prevent ejection of the vehicle occupant in a direction through the top of the passenger compartment; and
a frame surrounding a perimeter of the fabric net and to which the fabric net is secured, wherein the frame is configured to mount to the one or more roof rails of the passenger compartment of the vehicle.

2. The ejection mitigation device of claim 1, wherein the frame is formed of steel tubing.

3. The ejection mitigation device of claim 1, wherein the canopy is configured to be disposed at the roof of the vehicle and between an interior roof trim and the outer roof skin when the canopy is mounted to the one or more roof rails.

4. The ejection mitigation device of claim 1, wherein the canopy is further configured to mount to a center beam of the roof of the passenger compartment of the vehicle.

5. The ejection mitigation device of claim 1, wherein the canopy is further configured to mount to a header of the roof of the passenger compartment of the vehicle.

6. The ejection mitigation device of claim 1, further comprising mounting tabs to couple to the one or more roof rails and to secure the canopy to the one or more roof rails.

7. A vehicle occupant restraint device to be installed in a roof of a passenger compartment of a vehicle, comprising:

a panel of fabric having sufficient strength to restrain vehicle occupant movement through the panel of fabric to prevent ejection of the vehicle occupant in a direction through a top of the passenger compartment during an accident event resulting in failure of an outer roof skin of the roof; and a frame surrounding a perimeter of the panel of fabric and to which the panel of fabric is secured, the frame configured to mount to one or more roof rails of the passenger compartment of the vehicle, wherein the panel of fabric and the frame are configured to be disposed at the roof of the vehicle and interior to the outer roof skin when the frame is mounted to the one or more roof rails.

8. The vehicle occupant restraint device of claim 7, wherein the panel of fabric and the frame are configured to be disposed at the roof of the vehicle and between an interior roof trim and the outer roof skin when the frame is mounted to the one or more roof rails.

9. The vehicle occupant restraint device of claim 7, wherein the frame is further configured to mount to a center beam of the roof of the passenger compartment of the vehicle.

10. The vehicle occupant restraint device of claim 7, wherein the frame is further configured to mount to a header of the roof of the passenger compartment of the vehicle.

11. The vehicle occupant restraint device of claim 7, further comprising mounting tabs coupled to the frame and configured to couple to the one or more roof rails to secure the frame to the one or more roof rails.

12. The vehicle occupant restraint device of claim 7, wherein the frame and the panel of fabric are shaped to conform to a shape of a portion of the roof of the passenger compartment of the vehicle.

13. The vehicle occupant restraint device of claim 7, wherein the panel of fabric is formed of woven nylon fabric.

14. The vehicle occupant restraint device of claim 7, wherein the frame is formed of steel tubing.

15. A vehicle occupant roof ejection mitigation system, comprising:

an outer roof skin of a roof of a passenger compartment of a vehicle, the outer roof skin formed of a first material and disposed on a top of the passenger compartment; and a canopy comprising a fabric panel mounted to a rigid frame, the canopy having sufficient strength to restrain movement of a vehicle occupant through the canopy to thereby prevent ejection of the vehicle occupant through a top of the passenger compartment during an accident event resulting in failure of the outer roof skin of the roof, the canopy shaped to correspond to a shape of the roof of the vehicle and mounted to one or more roof rails of the passenger compartment of the vehicle at a position between the outer roof skin and an interior roof trim of the vehicle.

16. The vehicle occupant roof ejection mitigation system of claim 15, wherein the outer roof skin is configured to separate from the passenger compartment of the vehicle during certain collision events.

17. The vehicle occupant restraint device of claim 15, wherein the panel of fabric is formed of woven nylon fabric.

18. The vehicle occupant roof ejection mitigation system of claim 15, wherein the frame is formed of steel tubing.

19. The vehicle occupant roof ejection mitigation system of claim 15, wherein the canopy is mounted to a header of the roof of the passenger compartment of the vehicle.

20. The vehicle occupant roof ejection mitigation system of claim 15, further comprising mounting tabs coupling to the one or more roof rails to secure the canopy to the one or more roof rails.

21. The vehicle occupant roof ejection mitigation system of claim 15, wherein the canopy comprises a fabric net woven of straps of material.

\* \* \* \* \*